US012678377B2

(12) United States Patent
Hellenbrand

(10) Patent No.: US 12,678,377 B2
(45) Date of Patent: Jul. 14, 2026

(54) METHOD FOR PROVIDING A SINGLING DEVICE OF A STORAGE AND DISPENSING CONTAINER

(71) Applicant: Becton Dickinson Rowa Germany GmbH, Kelberg (DE)

(72) Inventor: Christoph Hellenbrand, Kaifenheim (DE)

(73) Assignee: BECTON DICKINSON ROWA GERMANY GMBH, Kelberg (DE)

( * ) Notice: Subject to any disclaimer, the term of this patent is extended or adjusted under 35 U.S.C. 154(b) by 78 days.

(21) Appl. No.: 18/398,752

(22) Filed: Dec. 28, 2023

(65) Prior Publication Data

US 2024/0122809 A1      Apr. 18, 2024

Related U.S. Application Data

(63) Continuation of application No. 17/114,249, filed on Dec. 7, 2020, now Pat. No. 11,903,906, which is a (Continued)

(51) Int. Cl.
*A61J 7/00*          (2006.01)
*B65D 83/04*       (2006.01)
(Continued)

(52) U.S. Cl.
CPC ........ *A61J 7/0084* (2013.01); *B65D 83/0409* (2013.01); *G06F 18/24* (2023.01);
(Continued)

(58) Field of Classification Search
None
See application file for complete search history.

(56) References Cited

U.S. PATENT DOCUMENTS

| | | | |
|---|---|---|---|
| 3,746,130 | A | 7/1973 | Bullas |
| 3,925,960 | A | 12/1975 | Saari et al. |

(Continued)

FOREIGN PATENT DOCUMENTS

| | | |
|---|---|---|
| CN | 103995949 | 8/2014 |
| EP | 2703301 | 3/2014 |

(Continued)

OTHER PUBLICATIONS

Australian Office Action for Application No. 2017275361, dated Mar. 30, 2021, 4 pages.

(Continued)

*Primary Examiner* — Nancy Bitar
(74) *Attorney, Agent, or Firm* — MASCHOFF BRENNAN

(57) ABSTRACT

A system includes a storage and dispensing container for drug portions, a memory and a processor. The process executes instructions to detect by a first detection device rays of light transmitted past a drug portion by a first light emitting source in a first direction, to detect by a second detection device rays of light transmitted past the drug portion by a second light emitting source in a second direction different from the first direction, to generate, by the first and second detection devices, an image of the drug portion, to process the image using image analysis, to determine specified drug information for the drug portion and to identify, based on the determined drug information, a suitable singling device fitting the drug portions to be singularized and to be disposed within the storage and dispensing container. Additional systems for identifying a singling device are also provided.

20 Claims, 5 Drawing Sheets

Related U.S. Application Data continuation of application No. 16/280,863, filed on Feb. 20, 2019, now Pat. No. 10,902,299, which is a continuation of application No. 15/172,382, filed on Jun. 3, 2016, now Pat. No. 10,255,524.

(51) Int. Cl.

| | |
|---|---|
| *G06F 18/24* | (2023.01) |
| *G06T 1/00* | (2006.01) |
| *G06V 10/56* | (2022.01) |
| *G06V 10/764* | (2022.01) |
| *G06V 20/66* | (2022.01) |
| *H04N 13/254* | (2018.01) |
| *G01D 5/34* | (2006.01) |

(52) U.S. Cl.

CPC ............ *G06T 1/0007* (2013.01); *G06V 10/56* (2022.01); *G06V 10/764* (2022.01); *G06V 20/66* (2022.01); *H04N 13/254* (2018.05); *G01D 5/342* (2013.01); *G06T 2207/10012* (2013.01); *G06V 2201/03* (2022.01)

(56) References Cited

U.S. PATENT DOCUMENTS

| | | | | |
|---|---|---|---|---|
| 8,712,163 | B1 | 4/2014 | Osheroff | |
| 9,415,392 | B2 | 8/2016 | Ismagilov et al. | |
| 10,229,321 | B2 | 3/2019 | Gershtein | |
| 10,255,524 | B2 | 4/2019 | Hellenbrand | |
| 10,467,477 | B2* | 11/2019 | Gershtein | G06V 10/40 |
| 2004/0011806 | A1 | 1/2004 | Luciano | |
| 2008/0093372 | A1 | 4/2008 | Milton | |
| 2011/0202171 | A1* | 8/2011 | Rosenbaum | B65B 35/18 |
| | | | | 707/758 |
| 2013/0329058 | A1 | 12/2013 | Brossette et al. | |
| 2014/0117239 | A1* | 5/2014 | Sakai | G01J 3/42 |
| | | | | 250/339.02 |
| 2015/0066205 | A1 | 3/2015 | Braun | |
| 2015/0154750 | A1 | 6/2015 | Royaee | |
| 2015/0251789 | A1 | 9/2015 | Lokkers et al. | |
| 2015/0302255 | A1* | 10/2015 | Gershtein | G06V 10/42 |
| | | | | 382/128 |
| 2016/0155018 | A1 | 6/2016 | Sakai | |
| 2016/0158952 | A1 | 6/2016 | Este | |
| 2016/0210524 | A1 | 7/2016 | Hasegawa | |
| 2016/0343151 | A1 | 11/2016 | Koike et al. | |

FOREIGN PATENT DOCUMENTS

| | | | |
|---|---|---|---|
| JP | 2003094367 | | 4/2003 |
| JP | 2004127084 | A | 4/2004 |
| JP | 2006172258 | A | 6/2006 |
| JP | 2014149175 | A | 8/2014 |
| JP | 2015523561 | A | 8/2015 |
| JP | 2015530138 | A | 10/2015 |
| KR | 20150052012 | A | 5/2015 |
| KR | 20160141884 | | 12/2016 |
| WO | WO-2013034504 | A1 | 3/2013 |
| WO | WO-2013184883 | | 12/2013 |
| WO | WO-2014142099 | A1 | 9/2014 |
| WO | WO-2015046044 | A1 | 4/2015 |
| WO | WO-2015119055 | A1 | 8/2015 |
| WO | WO-2015143058 | A1 | 9/2015 |

OTHER PUBLICATIONS

Brazilian Office Action for Application No. BR112018072461-0, dated Mar. 28, 2023, 6 pages including translation.

Canadian Office Action for Application No. 3025561, dated Mar. 24, 2023, 3 pages.

Chen et al., "An automatic drug image identification system based on multiple image features and dynamic weights", International Journal of Innovative Computing, Information and Control vol. 8, No. 5A, May 2012, (May 1, 2015), XP093047944, pp. 2995-3013, retrieved from the internet: URL:http//www.ijicic.org/ijicic-1101017.pdf.

Chinese Office Action for Application No. 201780034144.0, dated Dec. 14, 2023, 14 pages including translation.

Chinese Office Action in Application No. 201780034144.0, dated May 15, 2023, 10 pages excluding partial English translation.

Chinese Office Action in Application No. 201780034144.0, dated Oct. 19, 2022, 14 pages excluding English translation.

English translation of International Preliminary Report on Patentability for Application No. PCT/EP2017/060092, dated Dec. 4, 2018, 8 pages.

European Office Action for Application No. 16172837.3, dated Apr. 13, 2022, 11 pages including translation.

European Office Action for Application No. 16172837.3, dated Jan. 16, 2020, 18 pages including translation.

European Office Action for Application No. 16172837.3, dated Jun. 28, 2023, 18 pages including translation.

Extended European Search Report for Application No. 16172837.3, dated Dec. 12, 2016, 9 pages excluding English translation.

Indian Office Action for Application No. 201827044146, dated Jun. 7, 2021, 5 pages.

Japanese Office Action (Decision of Refusal) for Application No. 2018-562080, dated Apr. 26, 2022, 2 pages including translation.

Japanese Office Action (Dismissal of Amendment) for Application No. 2018-562080, dated Apr. 26, 2022, 10 pages including translation.

Japanese Office Action for Application No. 2018-562080, dated Mar. 9, 2021, 8 pages including translation.

Japanese Office Action for Application No. 2018-562080, dated Sep. 14, 2021, 8 pages including translation.

Korean Office Action for Application No. 10-2018-7032541, dated Mar. 10, 2022, 7 pages including translation.

Korean Office Action for Application No. 10-2018-7032541, dated Nov. 15, 2021, 10 pages including translation.

KR20160141884 English translation; Kim Jun Ho KR;Dec. 12, 2016.

Lee et al., "PILL-ID: Matching and Retrieval of Drug Pill Imprint Images", IEEE Computer Society, 2010 20th International Conference on Pattern Recognition (ICPR 2010), Istanbul, Turkey, Aug. 23-26, 2010, IEEE, Piscataway, NJ, USA, Aug. 23, 2010 (Aug. 23, 2010), pp. 2632-2635, XP0031771110, ISBN: 978-1-4244-7542-1, DOI 10.1109/ICPR.2010.645.

Mahmood et al., "3D Model Reconstruction from Multi-views of 2D Images using Radon Transform", Jurnal Teknologi, Bd. 74, Nr. 6, May 28, 2015 (May 28, 2015), XP093047939, Malaysia ISSN:0127-9696, DOI: 10.11113/jt.v74.4663, 74:6 (2015) 21-26, www.jurnalteknologi.utm.my, eISSN 2180-3722.

Singapore Office Action for Application No. 11201809995W, dated Apr. 5, 2021, 6 pages.

Singapore Office Action for Application No. 11201809995W, dated Feb. 28, 2023, 8 pages.

Singapore Office Action for Application No. 11201809995W, dated Jan. 22, 2020, 9 pages.

United Arab Emirates Office Action for Application No. P6001640/2018 prepared by KIPO, dated Aug. 23, 2022, 9 pages.

Yin, Dong et al., "Technology of Dispensing Check based-on Tablet Features", Artificial Intelligence, Management Science and Electronic Commerce (AIMSEC), 2011 2nd International Conference on, IEEE, Aug. 8, 2011, Seiten 2460-2462, XP031964050, DOI: 10.1109/AIMSEC.2011.6011146 ISBN: 978-1-4577-0535-9.

Brazilian Office Action for Application No. BR112018072461-0, dated Apr. 29, 2024, 6 pages including translation.

Indian Hearing Notice for Application No. 201827044146, dated Dec. 30, 2024, 3 pages.

\* cited by examiner

800

810
Providing a drug portion

820
Generating an image of the drug portion

830
Processing the image using image analysis

840
Determining specified drug information based on the image processing

850
Identifying a suitable singling device based on the determined drug information

METHOD FOR PROVIDING A SINGLING DEVICE OF A STORAGE AND DISPENSING CONTAINER

CROSS-REFERENCE TO RELATED APPLICATIONS

This application is a continuation of U.S. patent application Ser. No. 17/114,249 entitled "METHOD FOR PROVIDING A SINGLING DEVICE OF A STORAGE AND DISPENSING CONTAINER," filed on Dec. 7, 2020, which issued as U.S. Pat. No. 11,903,906 on Feb. 20, 2024, which is a continuation of U.S. patent application Ser. No. 16/280,863 entitled "METHOD FOR PROVIDING A SINGLING DEVICE OF A STORAGE AND DISPENSING CONTAINER," filed on Feb. 20, 2019, which issued as U.S. Pat. No. 10,902,299 on Jan. 26, 2021, which is a continuation of U.S. patent application Ser. No. 15/172,382 entitled "METHOD FOR PROVIDING A SINGLING DEVICE OF A STORAGE AND DISPENSING CONTAINER," filed on Jun. 3, 2016, which issued as U.S. Pat. No. 10,255,524 on Apr. 9, 2019, the disclosure of which are hereby incorporated by reference in their entireties for all purposes.

BACKGROUND

The present disclosure relates to a method for providing a singling device of a storage and dispensing container for drug portions.

Many automated blister machines, for example, as disclosed in the publication WO 2013/034504 A1, comprise, depending on the level of configuration, several hundred storage and dispensing containers for drug portions. These storage and dispensing containers store a plurality of drug portions of a specific drug and, upon request, individual drug portions may be dispensed. Using the automated blister machines, the drug portions stored in the storage and dispensing containers are combined and individually blister-packaged for each patient according to the medically prescribed administration time points. It depends on the measurements or dimensions of drug portions to be singularized which singling devices are installed. For known drug types, existing adapted singling devices can be accessed.

SUMMARY

One or more embodiments provide a system comprising a storage and dispensing container for drug portions; a memory storing instructions; and at least one processor configured to execute the instructions to: detect, by a first detection device disposed opposite a first light emitting source and above a drug portion of a specific drug type disposed on a top surface of the first light emitting source, rays of light transmitted past the drug portion by the first light emitting source in a first direction; detect, by a second detection device disposed opposite a second light emitting source, rays of light transmitted past the drug portion by the second light emitting source in a second direction different from the first direction; generate, by the first and second detection devices, an image of the drug portion; process the image using image analysis; determine specified drug information for the drug portion, the specified drug information comprising at least dimensions of the drug portion; and identify, based on the determined drug information, a suitable singling device fitting the drug portions to be singularized and to be disposed within the storage and dispensing container.

One or more embodiments provide a system comprising a storage and dispensing container for drug portions; a memory storing instructions; and at least one processor configured to execute the instructions to: generate, by a detection device, a plurality of images of a drug portion of a specific drug type, each successive image generated after physical rotation of the drug portion by a specified angular step; process the plurality of images; determine specified drug information for the drug portion, the specified drug information comprising at least dimensions of the drug portion; and identify, based on the determined drug information, a suitable singling device fitting the drug portions to be singularized and to be disposed within the storage and dispensing container.

BRIEF DESCRIPTION OF THE DRAWINGS

The device according to the present disclosure and the method according to the present disclosure are described in greater detail below, with reference to the appended drawings, wherein:

FIG. 1b is a perspective partial cut-away view of the storage and dispensing container of FIG. 1a;

FIG. 2b is a front elevation view of the singling device of FIG. 2a;

DETAILED DESCRIPTION

Figure 1B:
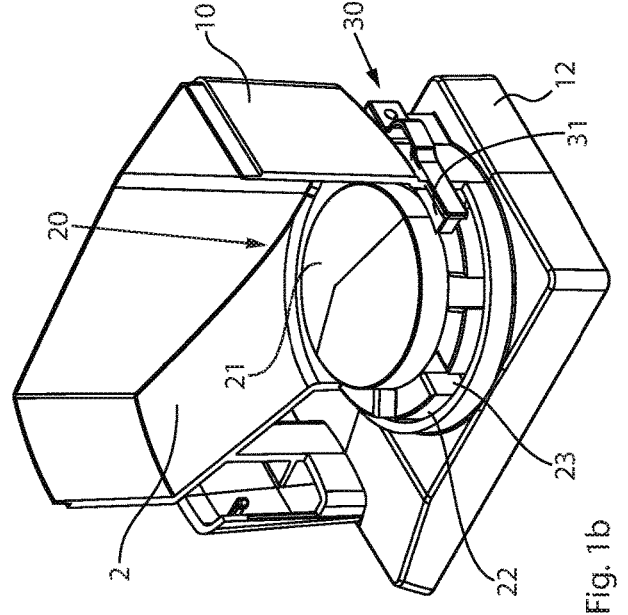

The detailed description set forth below describes various configurations of the subject technology and is not intended to represent the only configurations in which the subject technology may be practiced. The detailed description includes specific details for the purpose of providing a thorough understanding of the subject technology. Accordingly, dimensions are provided in regard to certain aspects as non-limiting examples. However, it will be apparent to those skilled in the art that the subject technology may be practiced without these specific details. In some instances, well-known structures and components are shown in block diagram form in order to avoid obscuring the concepts of the subject technology.

It is to be understood that the present disclosure includes examples of the subject technology and does not limit the scope of the appended claims. Various aspects of the subject technology will now be disclosed according to particular but non-limiting examples. Various embodiments described in the present disclosure may be carried out in different ways and variations, and in accordance with a desired application or implementation.

In order to combine drug portions, respective storage and dispensing containers are actuated for dispensing one or a plurality of singularized drug portions. When actuating a storage and dispensing container, a singling device, which is part of the storage and dispensing container, separates an individual drug portion that is transferred via a discharge aperture to a guiding device of the automated blister machine. Using the guiding device, a dispensed drug portion is, optionally by inter-positioning a collecting device, fed into a packaging device, which blister-packages individual or a plurality of drug portions according to the medical specifications. It is desirable to provide a methods and systems to provide singling devices of a storage and dispensing container in a quick, cost-effective and error-minimizing manner.

Using automated blister machines, not only prescription drugs but also, for example, food supplements (e.g., in the form of individual portions) or similar compositions may be blister-packaged. Within the scope of this application, the term drug portions shall also comprise such products or compositions. In other words, all compositions that can be dispensed and distributed in dimensionally stable portions shall be included.

In order to singularize the drug portions stored in a storage container of a storage and dispensing station, the singling device includes a rotor having multiple ducts conventionally situated at the outer circumference of the rotor. The ducts are, with regard to their measurements or dimensions, adapted to the respective drug portions to be separated in such a manner that, in a duct, the drug portions may be situated one above the other, but not be situated one next to the other. The number of drug portions disposed one above the other in a duct depends on the specific implementation of the singling device. If the ducts are implemented in such a manner that only one drug portion is received into a duct, a restraint member is situated above the duct rotated over a dispensing aperture, the restraint member restraining or preventing further drug portions from entering. If multiple drug portions can be received into a duct, a restraint member usually divides the duct into two parts with only the drug portions situated in the lower part of the duct being dispensed.

The measurements of the ducts of the rotors of the singling device are adapted to the size of the drug portions to be separated because a gentle singularizing of the drug portions may be ensured only when the measurements of the ducts are optimally adapted to the measurements of the drug portions. A precise adaptation also ensures a safe dispensing. In this way, only for a precise adaptation can it be ensured that for each dispensing process (rotor rotation) indeed one drug portion is dispensed. In the case of a non-precise adaptation, the drug portions can become wedged in the ducts and block the same.

The measurements or dimensions of individual drug portions of different types of drugs vary highly such that multiple storage and dispensing containers having different singling devices are typically used in an automated blister machine. Before first operating an automated blister machine, it is typically proceeded in such a way that the operator of the automated blister machine informs the manufacturer about the drug types which are to be blister-packaged. According to the specifications of the operator, the drug types adapted to the singling devices to be blister-packaged are then installed in the storage and dispensing containers and then adapted storage and dispensing containers are provided.

If the drug type is, however, new or the shape of the individual drug portion of a drug type known per se has been changed, the measurements or dimensions of the drug portion have to be ascertained. Typically, such drug portions are manually measured for this purpose. This can be carried out by the operator. The operator, however, also often sends new drug portions to the manufacturer for the new drug portions to be measured by said manufacturer.

This procedure is generally time-consuming and prone to error. For example, it can be difficult, for oval drug portions, to determine the length of the drug portion without error and small measuring errors can quickly slip in. As already mentioned above, an adaptation as precise as possible of the singling device to the dimensions of the drug portions to be singularized is, however, necessary because the risk of damaging the drug portions during the singling process is significantly increased. For this reason, even small measuring errors are, if possible, to be avoided.

According to the present disclosure a to-be-measured drug portion of a specific drug type is provided, the dimensions or measurements of this drug portion being typically known. After providing the drug portion, a digital image of the drug portion may be generated by a detection device. At least one digital image may be processed by image analysis, the specified drug information for the provided drug portion being determined. This drug information may include at least the dimensions or measurements of the drug portion.

Throughout this disclosure, "image-analytical processing" is to be understood that, based on the at least one digital image of the drug portion, the desired drug information is ascertained using known methods for image processing and image analysis. The processing may be carried out by an appropriate control device (e.g., a personal computer having appropriate software) so that the required drug information may be provided in a quick and reliable manner.

On the basis of the ascertained drug information, a singling device is identified that is suitable for the drug portions to be singularized. As soon as the suitable singling device is identified, the identified singling device may be provided and made available to the user. For this purpose, the storage inventory may be optionally accessed. However, it may be required to manufacture a singling device adapted to the drug information.

Ascertaining the measurements of a drug portion of a drug type and ascertaining a suitable singling device may be carried out in a fully automated manner by using methods for image processing and analysis, given that the applied methods and the detection device are suitable to ascertain the measurements or dimensions for such small objects such as drug portions with a required precision.

An identification of a suitable singling device may be carried out in a quick and reliable manner because the error proneness caused by a human user is averted through the automated measuring of a drug portion. Though furnishing the necessary hardware is associated with certain expenses, owing to the quick processing and the avoidance of erroneously assigned singling devices, the expenses are quickly amortized.

For the manufacture of drug portions, certain deviations with regard to the measurements between the different drug portions owing to certain production tolerances can result. In order to recognize this and to, if necessary, adapt the singling device, the drug information of multiple drug portions of the same drug type may be determined and the singling device may be identified on the basis of the drug information. For this purpose, steps of the disclosed method may often be respectively repeated. If a respective plurality of drug information is provided, the suitable singling device is identified. In this way, it is, for example, conceivable to adapt the singling device to the largest measurements determined. In this manner, the probability of faulty function may be further reduced.

The color of a drug portion can also be relevant for the dispensing process and with regard to controlling the dispensing as such. For this purpose, for example, a sensor may monitor a certain area for the dispensing opening. In order to optimize the monitoring, it may be provided that for the image-analytical processing, the color of the drug portion is additionally determined as part of the drug information.

On the basis of the determined drug information, a suitable singling device may be identified. For this purpose, it may be determined on the basis of the measurements of the drug portion which singling device is suitable. To identify, on the basis of the drug information, a suitable singling device, an inquiry may be made in a database, in which data for a plurality of singling devices are stored. In this manner, the suitable singling device can be ascertained quickly and without errors.

As already indicated, multiple storage and dispensing containers may be installed in modern automated blister machines so that a manufacturer always has a plurality of singling devices in stock. However, it is not ensured that each known singling device listed in a database used for an inquiry is always in stock. For this reason, as long as a suitable singling device is identified in a database, an updated inventory of these singling devices may be determined. The database may include the respective inventory information, a respective database of the manufacturer of the automated blister machine or of a third party (e.g., supplier of singling devices) may be accessed. If it turns out that the inventory of a specific singling device is low, the manufacture of further singling devices may be initiated.

Since new drug types are constantly put on the market, it can occur that for new or very rare measurement combinations a suitable singling device cannot be ascertained (e.g., that a singling device adapted to the ascertained measurements does not exist). Model data for a suitable singling device may be determined on the basis of the drug information as long as no suitable singling device is identified in a database inquiry. On the basis of the automatically generated model data, the suitable singling device may then be manufactured and provided. The necessary singling devices may be manufactured by the user. The model data may also be transmitted to the manufacturer or a third party, and the manufacturer or the third party may manufacture the required singling device on the basis of the obtained model data.

Furthermore, the model data may be used for the purpose of printing a model of a drug portion by means of a three dimensional (3D) printer and to test the new singling device by means of this model.

As already indicated, it is necessary for a gentle singularizing of the drug portions to precisely adapt the singling device to the measurements of the drug portions. In order to be able to precisely determine these measurements, multiple (e.g., a plurality of) images may be generated by an imaging device, the drug portions to be measured being rotated between the recordings by a specified angular step. A 3D model of the drug portion is determined during the image-analytical processing, on the basis of which the drug information is ascertained. For example, multiple images may be generated, each of which are differentiated by a specified angular step. In this manner, a very precise 3D model may be generated, on the basis of which the measurements of the drug portion may be very precisely determined.

The precision of the aforementioned method may be even further enhanced, with the multiple images being generated by an imaging device having a telecentric lens. When using a telecentric lens and suitable lighting, only almost axis-parallel rays of light pass this lens so that almost no measuring inaccuracies result on the basis of a varying distance of the drug portion/lens. A variation of the distance can occur if the drug portion, which is rotated during the course of the measurement, is not centrally situated on a respective rotation means. Thus, the use of a telecentric lens also facilitates operations because the central arrangement of the drug portion is no longer so relevant.

It is advantageous to provide singling devices before the first operation to be able to deliver an automated blister machine to a user that is adapted to the user's needs and desires. It will also occur, however, that, during the course of operating the automated blister machine, new drug types are to be blister-packaged or that the shape of the drug portions of known drug types changes. This requires that, in a storage and dispensing container to be loaded with new drug portions, a new, respectively adapted singling device is used. In order to ascertain such singling devices, the operator has to send a drug portion having unknown measurements to the manufacturer, who measures the drug portion and identifies and provides the suitable singling device. This is time and cost intensive. In some instances, certain drug portions are not allowed to be imported into the country in which the manufacturer of the automated blister machine has its production location.

For this reason, some steps may be carried out by a first user and at least one step may be carried out by a second user. Thus, the method may be divided, with the first user regularly corresponding to the operator of the automated blister machine. The operator thus provides and measures the drug portion and the identification on the basis of the ascertained drug information may then be carried out via the manufacturer or a third party. This method makes it superfluous that the drug portions be sent out for measuring and analysis. Measuring may be carried out by the operator who, of course, has to have the necessary equipment. Within this context, the data of the at least one generated image or of the determined drug information is transmitted by the first user to the second user by data remote transmission.

If the first and the second user operate in different locations, a specified number of singling devices may be made available to the first user by the second user.

Figure 1A:
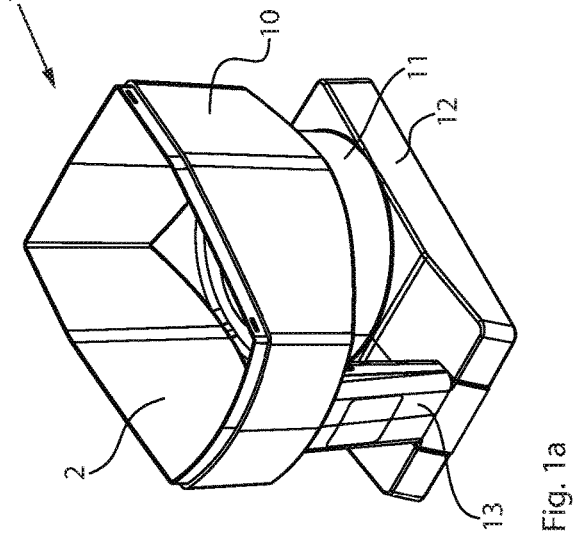
FIG. 1a is a perspective view of one or more embodiments of a storage and dispensing container.

Turning to FIGS. 1a and 1b, storage and dispensing container 1 includes a housing 10 enclosing a receiving space 2 for drug portions. The bottom portion of the housing 10 has a circular-cylindrical section 11, which is disposed on a base 12. Storage and dispensing container 1 also includes a handle 13. Housing 10 is delimited downwards by a bottom area having a dispensing aperture (not-shown) via which a drug portion, situated in a duct 23 aligned with the dispensing aperture, may be dispensed. As seen in FIG. 1b, a singling device 20 is situated in the circular-cylindrical section of housing 10, which at its outer circumference has a plurality of ducts 23 and protrusions 22 separating said ducts. Protrusions 22 form together with a center part 21, which is moved by an actuator (not-shown). Projections 22 may be integrally formed with center 21 part. However, it is also conceivable that projections 22 are attached at the outer circumference of center part 21 and, in this way, the ducts are created at the outer circumference of center part 21.

As it can be seen in FIG. 1*b*, storage and dispensing container 1 includes a restraint member 30 situated at the outside at circular-cylindrical section 11 of housing 10. Restraint member 30 includes a restraint section 31 inserted above a slot in circular-cylindrical section 11 into housing 10 and that is in such a manner that restraint member 31 is held slightly above a plane defined by protrusions 22. The dispensing aperture of the storage and dispensing container 1 and restraint section 31 of restraint member 30 are aligned to each other in such a manner that restraint section 31 is situated above the dispensing aperture. In doing so, further drug portions are restrained from entering a duct 23 situated above the dispensing aperture. Only when this duct 23 is rotated away from below restraint section 31 by a movement of the rotor, can a new drug portion enter the duct 23.

Figure 2B:
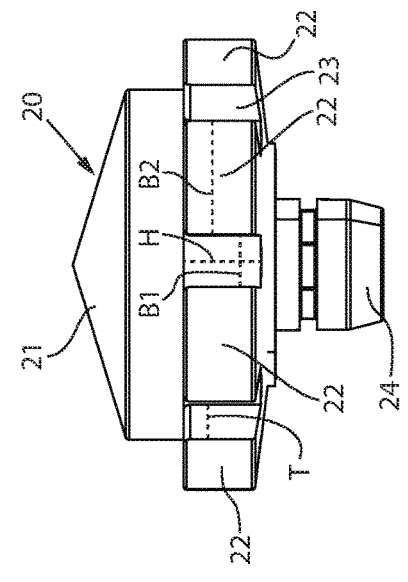
Figure 2A:
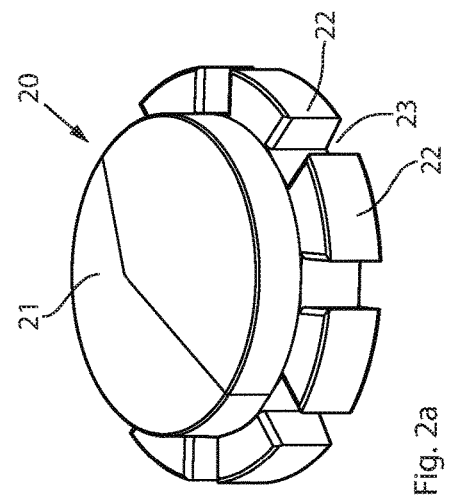
FIG. 2a is a perspective view of one or more embodiments of a singling device of a storage and dispensing container.

FIG. 2*a* illustrates singling device 20 having center part 21 and a plurality of protrusions 22 and a plurality of ducts 23. A singling device 20 is one of the central components of a storage and dispensing container 1. Because of the features described above, the singling devices 20 are installed in the storage and dispensing container 1 in such a manner that they can be replaced in a quick and uncomplicated manner by another singling device 20.

FIG. 2*b* shows a side view of singling device 20, the middle duct 23 being orthogonally aligned with the drawing plane. As it is already set out further above, the measurements of the duct 23, meaning its width B1, its height H and its depth T, are preferably adapted to the measurements of the drug portions to be singularized so that when singularizing the drug portions, damaging the drug portions can be averted by the geometry of the ducts 23 and of the protrusions 22.

For example, the ducts 23 may be situated in such a manner that their width is smaller than the width B2 of protrusions 22 separating the ducts 23. It is also conceivable that the width of the protrusions 22 is only slightly greater or even smaller than the width of the ducts 23 themselves. Furthermore, it is conceivable that the ducts 23 are implemented significantly wider and that the width corresponds, for example, approximately to the height of the ducts 23.

As it can be concluded from FIG. 2*b*, singling device 20 may have a shoulder 24, which may be inserted into a respective aperture in the storage and dispensing container 1 and via which the singling device 20 may be coupled to a motor (not shown).

Figure 3:
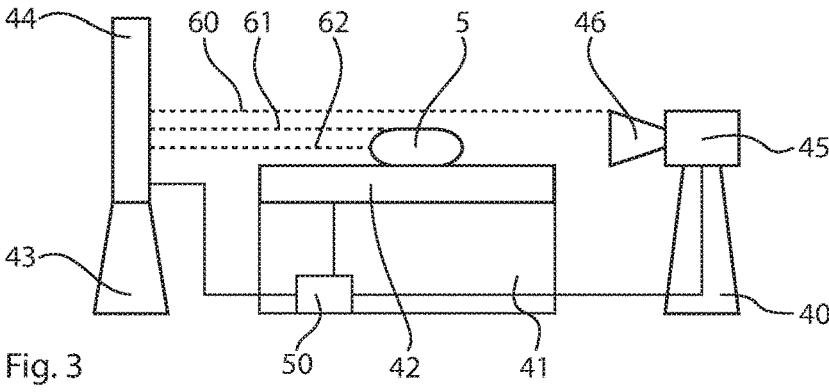
FIG. 3 is a schematic side view of one or more embodiments of a device for capturing a plurality of images of a drug portion.
Figure 4A:
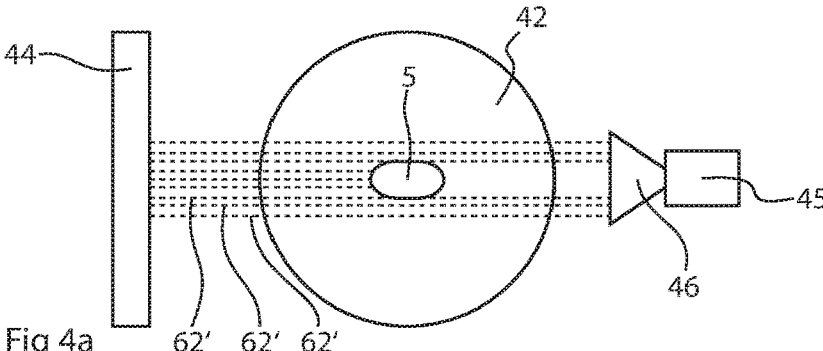
FIGS. 4a-4c are schematic top views of the device of FIG. 3, the drug portion being illustrated in different angular positions.
Figure 4B:
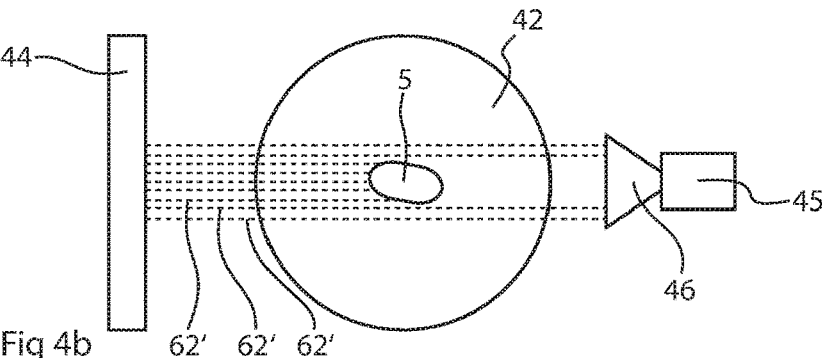
Figure 4C:
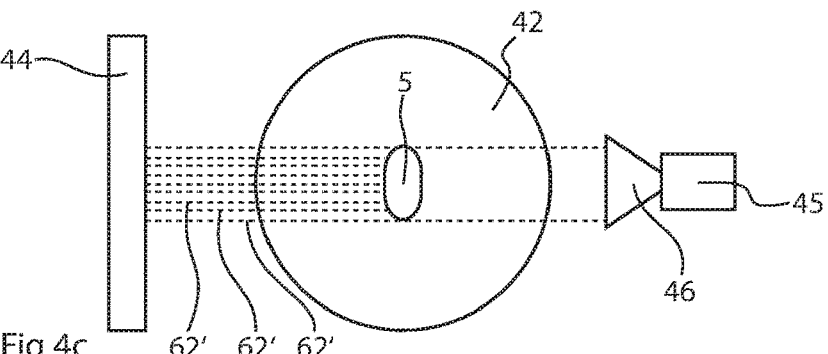

FIG. 3 shows a schematic side view of a device or arrangement for capturing a plurality of images of a drug portion 5. FIGS. 4*a* through 4*c* show different top views of the same device, the drug portion being illustrated in different angular positions in each figure.

The device includes a transmitted light source 44 situated on a support 43. The device also includes a detection device 45, 46, (e.g., a camera 45 having lens 46) situated on a support 40. Between the detection device 45, 46 and transmitted light source 44, is a table 41 having a rotary plate 42 on which a drug portion 5 is situated. Rotary plate 42 enables a refined adjustment of the rotary angle of the rotary plate 42 in relation to the axis transmitted light source 44/detection device 45, 46.

For example, a diffused planar light having a red luminous color may be used for transmitted light source 44. An IDS UI-5480CP-M-GL camera having a 5 mega-pixel sensor and a resolution of 2.560×1.920 pixels may be used as a camera 45, for example. The camera 45 may, for example, be used with a 35 mm lens 46 having an adapter ring.

At least rotary plate 42 and detection device 45, 46 may be connected to a control device 50, which controls the rotary plate 42 and which, at an appropriate angular position, actuates the detection device 45, 46 for generating the images. Control device 50 may also carry out the image-analytical processing and the identification of the suitable singling device 20. These method steps may also be carried out by a separate control device (e.g., a personal computer (PC) having appropriate software). Such a PC may be operationally connected to control device 50 for data transmission.

Supports 40, 43 and table 41 may only be used to simplify the handling of the overall arrangement as they are not substantial for the method according to the present disclosure and for the arrangement.

When using the aforementioned arrangement or device, the drug portions may be viewed in the transmitted light by the detection device 45, 46, here the camera 45, to obtain a plurality of two-dimensional (2D) images or projections. The drug information is not directly ascertained from a 2D image, but drug portion 5 is situated on rotary plate 42 and multiple images of the drug portion may be generated. For example, drug portion 5 may be rotated further by a small angular step (e.g., 1 or 2 degrees) after each image. In this manner, 2D images or projection result from a plurality of different directions. As a result of the shape of the drug portions, the drug portions are detected from approximately all relevant spatial directions according to an overall rotary angle of 180°. By overlaying the 2D images or projections obtained from the different directions, a 3D model having high resolution may be reconstructed during the image-analytical processing. On the basis of the aforementioned 3D model, the specified drug information may then be determined, this information at least including the dimensions of the drug portion. On the basis of this drug information, the suitable singling device 20 is then identified and subsequently is provided to the operator.

In FIG. 3, the path of rays from transmitted light source 44 to lens 46 of camera 45 is schematically illustrated on the basis of rays 60, 61, 62. It can be seen that rays 62, 61 are covered by the drug portion, while ray 60 unobstructedly impinges on the lens.

As it is already set out above, using a classic (e.g., entocentric) lens results in the problem that the enlargement scale depends on the distance between drug portion 5 and lens 46. If the drug portion 5 is moved closer to the lens 46 (e.g., by rotating rotary plate 42 when the drug portion 5 is non-centrically aligned on the rotary plate 42), the image is respectively enlarged. The reconstruction principle used for the image analysis may result in situations in which the object areas relevant for the reconstruction of a slice of the drug portion 5 change between the individual images in their vertical position, leading to errors for the reconstruction. In order to avoid these errors, in this arrangement or device, a telecentric lens and a telecentric illuminator may be used for transmitted light source 44.

A telecentric lens is distinguished in that only light rays having an almost axis-parallel path of rays pass the optics. Different from entocentric lenses, the image scale in the focus range of the lens is, for this reason, nearly independent from the distance between drug portion 5 and lens 46. The telecentric illuminator emits light in which all light rays are aligned in an axis-parallel manner to the optical axis. This enables a very sharp display of the edges of the drug portion 5 and reduces or eliminates reflections from light impinging laterally onto the drug portion 5.

A telecentric lens and a telecentric illuminator are quite cost intensive so that their use is only optional. Using a suitable software and corresponding "normal" lighting and a "normal" lens, may result in having sufficient precision to identify a suitable singling device 20 or to supply corresponding model data if no suitable singling device 20 is provided.

As already indicated, the rotary plate 42 is adjusted between the individual images by a certain rotary angle. For this purpose, the rotary plate 42 may be stopped between the individual steps and an image may be generated in the resting position of the rotary table 41 by the detection device 45, 46. Alternatively, the rotary table 41 may be continuously rotated. The rotary table 41 may be then, for example, coupled with an encoder (not shown), which may convert the mechanical rotary movement of the rotary table 41 into an electric signal, which in turn may trigger generating an image by the detection device 45, 46.

Furthermore, it is possible to rotate the rotary table 41 and/or rotary plate 42 at a constant, known speed. At a known rotary speed, the required time for half a rotation of the rotary table 41 is known so that the points in time at which an image of the drug portion 5 is generated by the detection device 45, 46 are known. In which way the plurality of images of the drug portion 5 in detail is generated is, however, not relevant for the present disclosure as such. Here, it is only preferable that a plurality of images is generated, it being preferable that the detection device 45, 46 in this instance is a telecentric lens.

FIGS. 4a through 4c show top views onto the arrangement shown in FIG. 3, with drug portion 5 being shown in three different rotary angles. On the basis of the only schematically indicated rays 62', the effect of the rotation on the path of rays can be seen. The further components correspond with those described in FIG. 3.

Figures 5, 6:
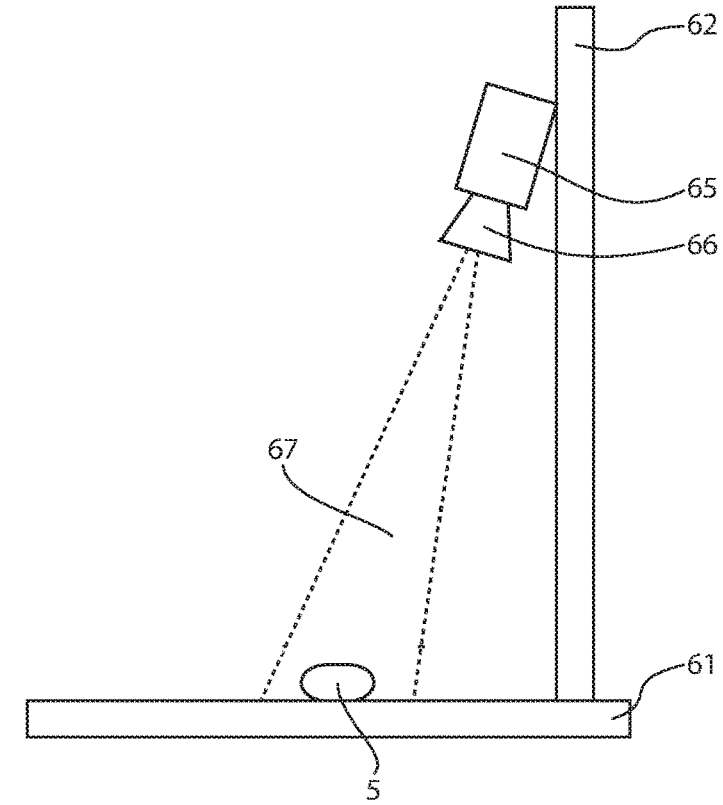
FIG. 5 is a schematic side view of one or more embodiments of a device for capturing an image of a drug portion.
FIG. 6 is a schematic side view of one or more embodiments of a device for capturing an image of a drug portion.

FIG. 5 shows a schematic side view of a further device or arrangement suitable for capturing an image of a drug portion 5. The device may include a rest surface 61 situated at a stand 62. A detection device 65, 66 may be situated in the top area of stand 62. For example, the detection device 65, 66 may be a 3D scanner. The scanner 65, 66 may be formed by a stereo camera system having a centrally positioned LED projector. The LED projector may emit a cone of light 67 onto rest surface 61, and the to-be-measured drug portion 5 may be situated in this cone of light 67.

For generating an image, a striped pattern of blue, red or IR light may be projected onto to-be-measured drug portion 5, the spatial frequency and phase shift of light varying with time. In this way, using a triangulation method, in addition to an intensity value and the position in the X and Y directions, the respective distance from the camera system may also be ascertained for each camera pixel without having to move the drug portion 5 or the 3D scanner 65, 66 itself.

The measuring process itself may take less than one second up to a few seconds, depending on the set exposure time. In this example, the minimum distance from the measuring object is approximately 150 mm, and the measuring area has a size of 60×105 mm. The 3D scanner 65, 66 generates an image in the form of a 3D point cloud, from which the specified drug information may be determined during the image-analytical processing, this information including at least the dimensions of the drug portion 5.

FIG. 6 shows a device or arrangement for capturing an image of a drug portion 5. The device or arrangement includes a bottom area 70 having a recess in which a transmitted light source 74 may be situated. Two perpendicular supports 71, 75 may be situated on bottom area 70. A horizontal arm 72 may be attached at support 71, at which a detection device 78, 79 may be situated. A comparable detection device 76, 77 may be situated at support 75, and opposite of this detection device 76, 77, a second transmitted light source 73 may be situated. For example, the detection devices 76, 77 and 78, 79 may be matrix cameras, meaning cameras having matrix-like sensors, opposite of which respectively one transmitted light source 74, 73 is situated.

The optical axis of detection device 78, 79 may be aligned perpendicular to the rest surface of transmitted light source 74, and the optical axis of detection device 76, 77 may be aligned perpendicular to the surface of transmitted light source 73 so that the detection devices 76, 77 and 78, 79 may detect the respective maximum cross section of the drug portion resting on transmitted light source 74.

In FIG. 6, the path of rays of some of the rays of light emitted by transmitted light sources 73, 74 is schematically illustrated. Caused by the shape of the drug portion 5, rays 90, 91 of transmitted light source 73 are covered by drug portion 5, while rays 92, 93 are detected by detection device 76, 77. This applies correspondingly to detection device 78, 79 only receiving emitted rays of light 80 through 83 by transmitted light source 74, while the rays of light radiated in the area of the drug portion 5 are blocked by the drug portion 5.

On the basis of the construction of the device or arrangement illustrated in FIG. 6, 3D recordings cannot be generated. However, on the basis of using two detection devices 76, 77 and 78, 79 may and two transmitted light sources 73, 74, an image may be generated on the basis of which all necessary measurements of drug portion 5 resting on transmitted light source 74 may be ascertained during the image-analytical processing.

Subsequently, the image-analytical processing of the recordings, which are generated by a device or arrangement according to FIGS. 3, 4a through 4c, is briefly discussed with reference to the flow chart in FIG. 7. As already indicated, when generating the images, a drug portion 5 may be situated on a rotary table 42, which may be located between a detection device 45, 46 and a transmitted light source 44. Images of the drug portion 5 may be generated at different rotary angles so that, for an angular step of, for example, one degree, a series of 180 single recordings may be generated. With regard to the shape of conventional drug portions 5, the result would be repeated for angular areas of more than 180 degrees, which would entail superfluous processing.

For an angular step of one degree, 180 images or projections of the drug portion onto the two-dimensional sensor surface of the detection device 45, 46 result (e.g., recordings from N=180 of different spatial directions result). Subsequent to the 180 two-dimensional projections or recordings of the drug portion obtained in this way, a 3D model may be reconstructed layer by layer, on the basis of which the defined drug information for the drug portion 5 may be determined.

Figure 7:
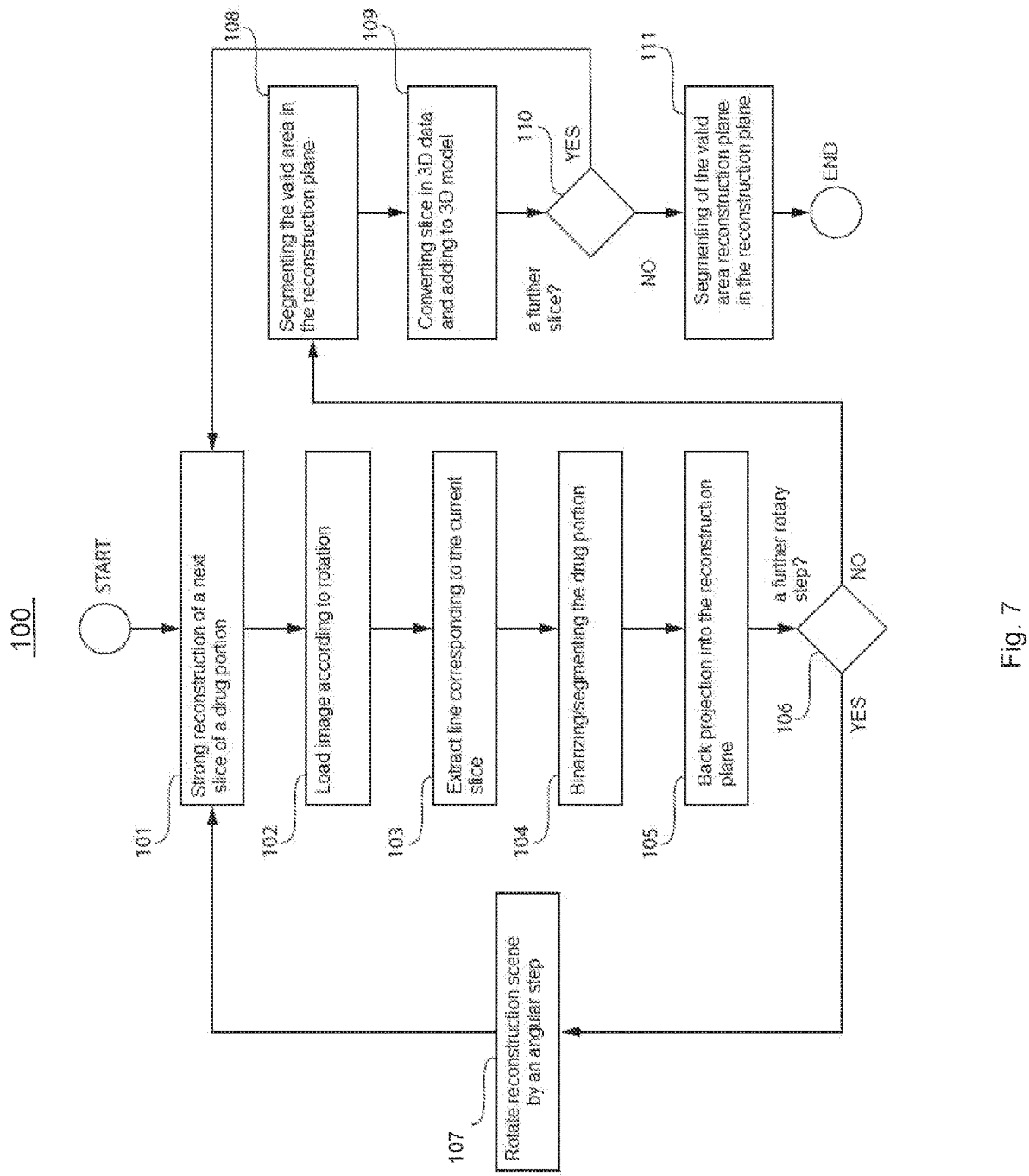
FIG. 7 shows a flow chart for image-analytical processing of a plurality of images of a drug portion.

The actual reconstruction of the 3D model is described in detail in the sequence chart 100 in FIG. 7. Since the exact execution of the image-analytical processing (here, the reconstruction) is, however, not a substantial aspect of the present disclosure, only a short summary is subsequently provided. On the basis of the flow chart from FIG. 7, it is seen in which way the image-analytical processing in detail unfolds when using a device according to FIGS. 3, 4a through 4c.

In step 101, a strong reconstruction of a next slice of a drug portion is completed. An image is loaded according to the rotation of the plate in step 102, and a line corresponding to the current slice is extracted in step 103. In step 104, the drug portion is binarized and/or segmented, and back projected into the reconstruction plane in step 105. Determining whether a further rotary step is desired occurs in step 106, and if it is, the reconstruction scene is rotated by an angular step in step 107 and steps 101-105 are repeated. If no further rotary step is desired, the valid area in the reconstruction plane is segmented in step 108, and the slice is converted into 3D data and added to the 3D model in step 109. In step 110 if it is determined that a further slice is desired, the process begins again at step 101. If a further slice is not desired, the valid plane area reconstruction plane is segmented in the reconstruction plane in step 111.

Thus, in reconstructing the 3D model, the individual images are first binarized. That is, the individual pixels of the images are marked as "belonging to the drug portion" or as "belonging to the background." The reconstruction of the 3D model proceeds in lines or layers. Each layer of the 3D model corresponds to one line of the sensor of the detection device. For reconstructing a layer, the information of the respective lines of all individual images are necessary.

For example, for reconstructing the topmost slice, the topmost line of all individual images is consulted. The information from one line is a one-dimensional projection of a slice of the drug portion onto the camera sensor line. These one-dimensional projections are projected from the direction corresponding to the respective image angle into a two-dimensional space (e.g., back projection 105). By overlaying all N two-dimensional projections, the layer of the drug portion 5 corresponding with the respective camera line then results.

After this process has been carried out for all camera lines in which at least one pixel belongs to the drug portion 5, the 3D model of the drug portion 5, from which the drug portions 5 are then ascertained, results by stacking the 2D layers obtained as described above in the three-dimensional space. On the basis of the ascertained drug information, the suitable singling device 20 is then identified and provided to the user.

Figure 8:
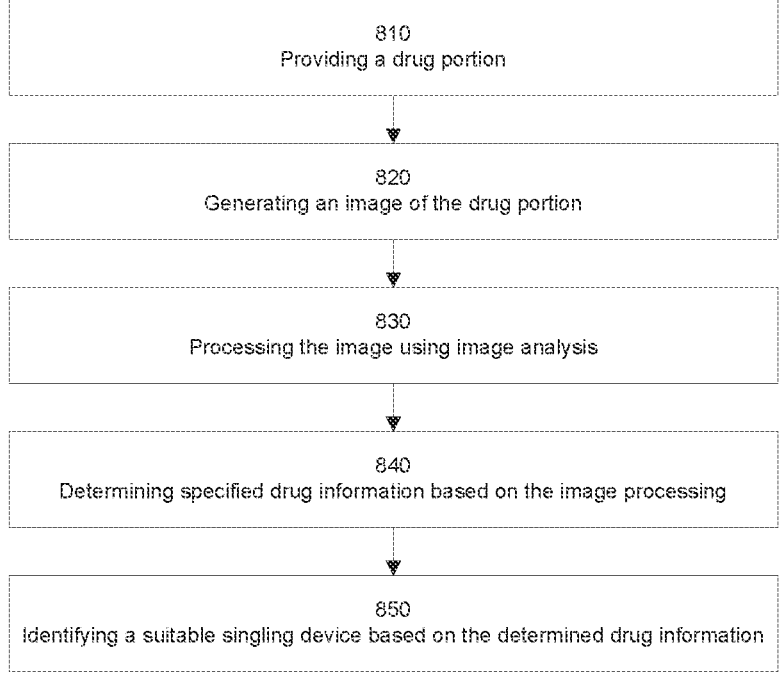
FIG. 8 is a flow chart illustrating steps in one or more embodiments of a method for providing a singling device of a storage and dispensing container.

FIG. 8 illustrates a method for providing a singling device 800. Step 810 includes providing a drug portion. In step 820, an image of the drug portion is generated by a detection device (e.g., scanner, camera, lens). The generated image is processed using image analysis, in step 830. In step 840, specific drug information is determined based on the results of the image processing. In step 850, a suitable singling device to be used in dispensing the provided drug portion is identified based on the determined drug information.

The present disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

A reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

The word "exemplary" or the term "for example" is used herein to mean "serving as an example or illustration." Any aspect or design described herein as "exemplary" or "for example" is not necessarily to be construed as preferred or advantageous over other aspects or designs. In one aspect, various alternative configurations and operations described herein may be considered to be at least equivalent.

As used herein, the phrase "at least one of" preceding a series of items, with the term "or" to separate any of the items, modifies the list as a whole, rather than each item of the list. The phrase "at least one of" does not require selection of at least one item; rather, the phrase allows a meaning that includes at least one of any one of the items, and/or at least one of any combination of the items, and/or at least one of each of the items. By way of example, the phrase "at least one of A, B, or C" may refer to: only A, only B, or only C; or any combination of A, B, and C.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user. The accompanying method claims, if any, present elements of the various steps, operations or processes in a sample order, and are not meant to be limited to the specific order or hierarchy presented.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f) unless the element is expressly recited using the phrase "means for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way.

The invention claimed is:

1. A system, comprising:
   a storage and dispensing container for drug portions;
   a memory storing instructions; and
   at least one processor configured to execute the instructions to:
   detect, by a first detection device disposed directly opposite a first light emitting source and above a drug portion of a specific drug type disposed on a top surface of the first light emitting source, rays of light transmitted past the drug portion by the first light emitting source in a first direction;
   detect, by a second detection device disposed directly opposite a second light emitting source, rays of light transmitted past the drug portion by the second light emitting source in a second direction perpendicular to the first direction;
   generate, by the first and second detection devices, an image of the drug portion;
   process the image using image analysis;
   determine specified drug information for the drug portion, the specified drug information comprising at least dimensions of the drug portion; and
   identify, based on the determined drug information, a suitable singling device fitting the drug portions to be singularized and to be disposed within the storage and dispensing container.

2. The system of claim 1, the at least one processor configured to execute the instructions to:
   determine drug information of a plurality of drug portions of the same drug type by repeating the detecting, generating, and processing steps; and
   identify the suitable singling device based on the plurality of the determined drug information.

3. The system of claim 1, the at least one processor configured to execute the instructions to:
   determine a color of the drug portion, wherein the determined drug information includes the determined color of the drug portion.

4. The system of claim 1, the at least one processor configured to execute the instructions to:
   identify the suitable singling device by making an inquiry based on the determined drug information in a database in which data for a plurality of singling devices are stored; and
   determine an updated inventory of the suitable singling device if a suitable singling device is identified in the database inquiry.

5. The system of claim 1, the at least one processor configured to execute the instructions to:
   identify the suitable singling device by making an inquiry based on the determined drug information in a database in which data for a plurality of singling devices are stored; and
   determine model data for a suitable singling device based on the drug information if no suitable singling device is identified in the database inquiry.

6. The system of claim 1, the at least one processor configured to execute the instructions to:
   determine a three-dimensional model of the drug portion; and
   determine the drug information based on the determined three-dimensional model.

7. The system of claim 1, the at least one processor configured to execute the instructions to use the image analysis to:
   determine rays of light from the first light emitting source in the first direction that are blocked by the drug portion; and
   determine rays of light from the second light emitting source in the second direction that are blocked by the drug portion.

8. The system of claim 1, wherein disposing the drug portion of the specific drug type on the first light emitting source and generating the image of the drug portion are carried out by a first user and at least the identifying the suitable singling device is carried out by a second user.

9. The system of claim 8, wherein one of:
   data of the generated image is transmitted from the first user to the second user using data remote transmission;
   the determined drug information is transmitted from the first user to the second user using data remote transmission; and
   a specified number of singling devices is made available to the first user by the second user.

10. A system, comprising:
    a storage and dispensing container for drug portions;
    a memory storing instructions; and
    at least one processor configured to execute the instructions to:
    generate, by a detection device, a plurality of images of a drug portion of a specific drug type, each successive image generated after physical rotation of the drug portion by a specified angular step;
    process the plurality of images;
    determine specified drug information for the drug portion, the specified drug information comprising at least dimensions of the drug portion; and identify, based on the determined drug information, a suitable singling device fitting the drug portions to be singularized and to be disposed within the storage and dispensing container, wherein the detection device comprises a first detection device disposed directly opposite a first light emitting source and a second detection device disposed directly opposite a second light emitting source, wherein an optical axis of the first detection device is aligned perpendicular to the first light emitting source and an optical axis of the second detection device is aligned perpendicular to the second light emitting source.

11. The system of claim 10, the at least one processor configured to execute the instructions to:

determine drug information of a plurality of drug portions of the same drug type by repeating the generating and processing steps; and identify the suitable singling device based on the plurality of the determined drug information.

12. The system of claim 10, the at least one processor configured to execute the instructions to:

determine a color of the drug portion, wherein the determined drug information includes the determined color of the drug portion.

13. The system of claim 10, the at least one processor configured to execute the instructions to:

identify the suitable singling device by making an inquiry based on the determined drug information in a database in which data for a plurality of singling devices are stored; and determine an updated inventory of the suitable singling device if a suitable singling device is identified in the database inquiry.

14. The system of claim 10, the at least one processor configured to execute the instructions to:

identify the suitable singling device by making an inquiry based on the determined drug information in a database in which data for a plurality of singling devices are stored; and determine model data for a suitable singling device based on the drug information if no suitable singling device is identified in the database inquiry.

15. The system of claim 10, the at least one processor configured to execute the instructions to:

determine a three-dimensional model of the drug portion; and determine the drug information based on the determined three-dimensional model.

16. The system of claim 15, wherein the detection device comprises one of:

a camera configured to obtain a plurality of two-dimensional images of the drug portion and the at least one processor is configured to execute the instructions to reconstruct a three-dimensional model based on overlaying the plurality of two-dimensional images; and a three-dimensional scanner configured to generate a three-dimensional point cloud image of the drug portion.

17. The system of claim 10, wherein the generating the plurality of images of the drug portion by the detection device are carried out by a first user and at least the identifying the suitable singling device is carried out by a second user.

18. The system of claim 17, wherein one of:

data of the generated image is transmitted from the first user to the second user using data remote transmission;

the determined drug information is transmitted from the first user to the second user using data remote transmission; and a specified number of singling devices is made available to the first user by the second user.

19. The system of claim 10, the at least one processor configured to execute the instructions to:

generate the plurality of images by the detection device comprising an imaging device having a telecentric lens.

20. The system of claim 10, the at least one processor configured to execute the instructions to:

rotate a rotary plate upon which the drug portion is disposed to rotate the drug portion by the specified angular step.

* * * * *